Patented July 2, 1935

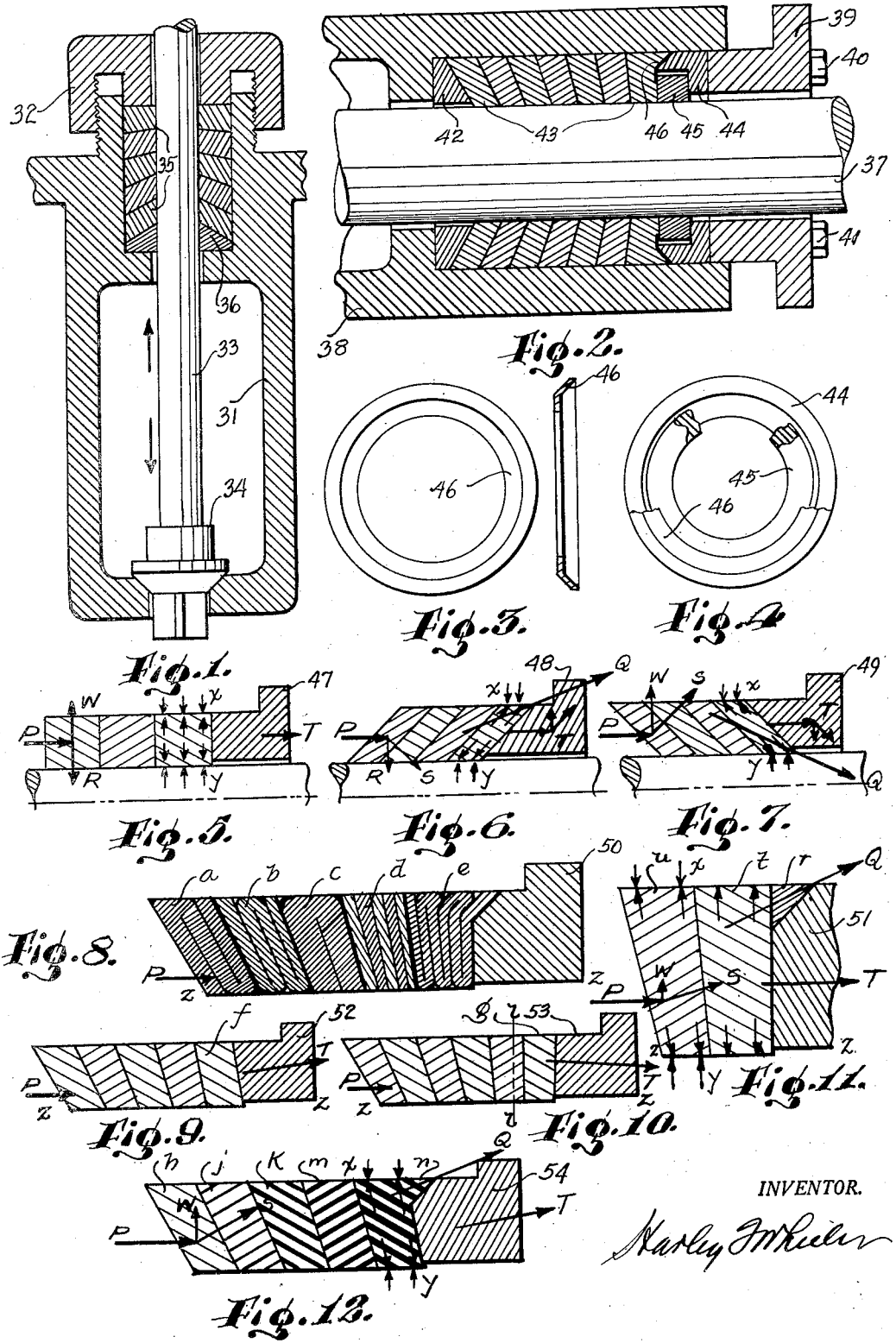

2,006,529

UNITED STATES PATENT OFFICE 2,006,529

CONSTANT FRICTION PACKING

Harley T. Wheeler, Dallas, Tex.

Application September 19, 1932, Serial No. 633,792

6 Claims. (Cl. 288—1)

My invention relates to packing rings for use in sealing off the escape of fluid under pressure about a moving rod or shaft. The packing is also adapted for use on pistons and seals between moving and stationary surfaces.

It is a common difficulty with packing rings made of flexible porous material that the pressure in the stuffing box acting upon the packing, tends to create unequal friction at points along the rod due to the packing, thus resulting in excessive wear upon the rod at certain areas.

It is an object of my invention to provide a packing which, because of the formation of the rings, will serve to seal off about the moving part with approximately uniform friction thereon. I desire to produce packing wherein the friction due to contact is constant for any range of pressures due to the fluid.

I further aim to provide a packing in which the porous structure of the packing results in a film of the pressure fluid between the packing and the moving surface, thus providing lubrication of the parts.

Another object is to provide a packing structure in which the thrust due to the fluid pressure is transmitted to the packing gland without material friction upon the moving surface.

I also desire to form a packing in which the sealing pressures along the stationary surface may be regulated to any desired amount without regard to the sealing effect along the movable surface.

I also aim to provide a packing assembly wherein the tightening of the gland moves the packing toward the moving part without transferring the thrust due to the fluid pressure.

In the drawing herewith I have shown several embodiments of packing whereby my invention may be carried out. Fig. 1 is a longitudinal section showing a reciprocating valve stem under constant pressure having my packing installed thereon.

Fig. 2 is a similar section showing a stuffing box with my packing employed therein about a rotating shaft.

Fig. 3 shows a top plan and cross-section, respectively, of a shield employed for the floating adapter shown in Fig. 2.

Fig. 4 is a front view partly in section of the floating adapter shown in Fig. 2.

Figs. 5, 6, and 7, respectively, are diagrammatic illustrations in section through the gland and adjacent packing rings showing the manner in which the pressures are resolved.

Fig. 8 shows various ring constructions which may be employed making up conical packing rings with non-parallel laminations.

Fig. 9 is a transverse section through a plurality of rings and the adjacent gland for narrow tapered rings.

Fig. 10 is a longitudinal section showing a similar arrangement of packing rings of greater annular width.

Fig. 11 is a cross-section through rings of still wider form.

Fig. 12 illustrates the resolution of the forces found in constant friction packing having a variation in density.

In accomplishing my object of producing an assembly of packing rings which has a uniform and constant friction throughout the packing, I contemplate the arrangement of the packing in a stuffing box so that the rings are of a generally frusto-conical shape with the apex of the cone pointed away from the source of fluid pressure. I do not contemplate the use of rings in which the opposite sides of the rings are parallel, but as will be seen from the description which follows the rings are preferably formed with non-parallel sides and converging from the wall of the box toward the rod and away from the source of pressure.

I have found that in the case of a porous body such as a packing member in contact with a solid body, that the thrust due to the fluid medium against the porous structure may be deflected parallel to or away from the movable surface and the joint may still be sealed by the fluid pressure. I find that friction is caused by two forces; one, the thrust due to a pressure drop throughout the length of the packing which forces the packing ring against the adjacent surface; and, two, the friction due to saturating a porous structure confined within a box, such saturation being due to the fluid medium under pressure which tends to increase the volume of the packing and to hence press against the contiguous surface.

In Fig. 1 is shown one form of packing serving to pack off about a turbine valve stem having a constant pressure impressed thereon from a steam chest, not shown, and subjected to a reciprocating motion, as shown by the arrows.

The bonnet 31 is attached to the steam chest and has connected with it a screw type of gland 32 through which the valve stem 33 extends, and to which is attached the valve head 34. The constant friction packing 35 is held in place in the stuffing box against an adapter 36, of conical shape, by the gland 32. Said adapter also acts as a bearing to guide the valve stem.

In Fig. 2 I have shown a special adaptation of my packing upon a rotatable shaft 37 which extends outwardly through the frame 38 of the machine. It has a gland 39 adjusted by cap screws 40 and 41 which may force the packing 43 into compression within the stuffing box. There is an adapter 42 at one end of the packing which has a conical surface inclined outwardly away from the machine frame. There are also adapters 44 and 45 adjacent the gland 39. The adapter 45 is a floating member fitting within a recess in the adapter 44. The open joint between the members 44 and 45 is covered by a shield 46 which is best seen in Figs. 3 and 4. It will be seen that the shield is shaped to fit along a beveled surface upon the adapter 44 and against the inner radial face of the adapter 45.

In Fig. 4 the assembly of the two sections of the adapter with the shield thereon is best illustrated.

To explain the operation and describe the various parts used in adapting my constant-friction packing to conditions which ordinarily exist, an analysis of three commonly used porous packings is now made. Fig. 5 shows a common square braided type, impregnated with a fluid under a pressure P, which causes a fluid tension in the structure.

Liquid pressure may be resolved in any and all directions, as for example, the impressed pressure P of the liquid may be resolved toward the movable surface as force R and against the wall as force W and against the gland 47 as thrust T, plus or minus any friction of contact, depending on the direction of the rod movement. The saturation effect is shown by the small arrows, the film of fluid built up on the contiguous surfaces by the arrows $x$ and $y$. I find this form of packing to be efficient only with liquid and it is indefinite in its action under gas or steam.

Fig. 6 illustrates an assembly in outline of a series of conical paralle faced rings, the concave surfaces directed toward the source of the pressure P and held in place by a conically faced gland 48. The impressed pressure P is resolved at any point as a thrust due to drop of internal pressure into a force S normal to the ring face and towards the rod as a component R normally applied. This resolution of pressure is made to obtain the pressures normal to the rod and to the rings. Longitudinal saturation effects are indicated by the small arrows and the film of fluid on the contiguous surfaces by the arrows $x$ and $y$. The arrow Q indicates the direction of the reaction of the conical rings. This reaction takes place only where there is a porous packing and is caused by seepage flow of the fluid through the inclined sections causing a wedging action of the porous structure varying with the angle of inclination of the ring and is explained in detail by my application, Serial No. 580,015, filed December 10, 1931. The reaction of these frusto-conical rings resists leakage about the stationary surface of the box by the expansion of the porous packing ring and is caused by saturation of said ring with the pressure fluid accompanying the seepage through the rings. It is a characteristic of porous rings only and is absent in metallic or other rings impervious to the entrance of fluid.

Fig. 7 shows an assembly of conical rings having parallel faces their smaller ends inclining away from the source of pressure P and held in place by the gland 49. The impressed pressure P is now resolved into a force S normal to the ring face in a direction away from the movable surface and into a component W normal to the wall, or stationary surface. The saturation effects tending to elongate the ring cross-section are shown by small arrows and the films of the fluid medium under pressure on the contiguous surfaces by the arrows $x$ and $y$. The direction of the annular wedge ring reaction is shown by the arrow Q and is toward the rod surface. The thrust against the gland 49 for rotary motion is that of the wedging action Q plus that of the thrust T. For translation away from the source of pressure the friction of contact is that due to the expansion of the rings by being saturated, plus the contact of reaction Q, plus the resolution of the thrust T. For a reverse translation, the foregoing quantities are properly interpreted.

The packings of Figs. 5, 6, and 7 will hold pressure under certain conditions, their efficiencies depending upon the manner of use and the ring construction. Most of the reactions possible to porous structures are created by these three types, the resolution of the thrust due to internal pressure drop being both toward and away from the movable surface, the ring reaction being shown as resolved toward or away from the rod surface. These pressures result in the creation of films on the contiguous surfaces. The friction created by all three types increases in some proportion to the pressure increase.

By synthesis of the reactions I have created the constant-friction packing structure, having all of the elements mentioned but so controlled by the design that a new effect is attained, as shown by Fig. 8. The ring $a$ is a cone having nonparallel faces, the convex faces inclining away from the source of the pressure P. Section $b$ is similar except that the faces and laminations of the rings are convergent toward the normal, or perpendicular to the movable surface as represented by the plane $z$—$z$. The rings $c$ and $d$ converge at a greater rate more nearly radial to the rod and the outer face of ring $e$ is perpendicular to the wall and the movable surfaces, as is the thrust-taking face of the gland 50. Ring $a$ is a fold and a half, or a pleated ring; the ring $b$ is a dual fold, another pleated type; ring $c$ is a single fold, or a plait; ring $d$ is either a helical strip wound ring or an assembly of annular rings; ring $e$ is a triple fold pleated type. It may be noted that the laminations are all converging and not parallel each to the other, or to the ring faces.

Fig. 11 illustrates the result of the synthesis of the reactions shown in Figs. 5, 6, and 7. The thrust-taking face of the gland 51 is normal to the movable surface represented by the plane $z$—$z$. At the joint between the gland 51 and the stationary surface a beveled surface is made on the gland face providing a recess into which the wedge-shaped porous annulus $r$ fits, making, in combination with the gland face, a surface normal to the confining surfaces of the box.

The surface of the ring $t$ contiguous to the gland 51 is also normal as before stated, its opposite face inclining away from the source of the pressure P. The ring $u$ is a representative cone, its convexity inclining away from the source of pressure P, its faces non-parallel and contiguous to the concave side of the ring $t$. The pressure P is resolved at any point into force S normal to the ring face or to any lamination shown in Fig. 8, and also into a component W normal to the stationary surface, the foregoing resolutions of thrust due to internal pressure drop being away from the movable surface.

The direction of the saturation effect tending to elongate the ring cross-section and represented by the small arrows, inclines away from the source of pressure except in ring $t$ adjacent to the face of the gland, the elongation in this region being perpendicular to both surfaces contiguous to the periphery of the ring. The thrust T, equal to the intensity of the pressure P, plus or minus any friction due to contact of the movement of the rod, is absorbed solely by the gland 51 and cannot be resolved toward the movable surface. The annular wedge ring reaction Q takes place at the stationary surface and causes the ring $r$ to seal the joint at that point.

There remains only the effect of the ring elongation due to saturation to seal the movable surface. This is accomplished by the establishment of films of the fluid medium under pressure as shown by the arrows $x$ and $y$. The ring structure being porous, by this arrangement it acts as a carrier for the fluid medium and creates a continuous film of said fluid medium to be automatically formed without the use of external lubricants or of impregnations.

The effect of the width of the annular space on all types of rings and packing sets is considerable when the thrust due to the drop of pressure is resolved against the movable surface. The constant-friction type herein described, is less affected and may be easily compensated, as in Figs. 9 and 10, a series of converging sections which may or may not be laminated, and held in place by the glands shown. In Fig. 9 the face of the gland 52 is not perpendicular to the movable surface but has a slight declination away from the source of pressure P resulting in the thrust T being directed away from the movable surface as represented by the plane $z$—$z$. A still further useful combination is shown by Fig. 10, a wide width on a small rod for example, the innermost face of the ring $g$ being normal to the movable surface, while the face contiguous to the gland 53 is concave and inclined slightly toward the source of the pressure P. The thrust T inclines slightly toward the movable surface as represented by the plane $z$—$z$.

As most of the thrust resolutions at points within the sections are away from the movable surface this compromising device which assists in sealing the joint gives a lower friction valve in such extreme cases. Referring to the divisional line 1—1, Fig. 10, this design may be considered to be two constant friction packings with convex faces on one end and a plane radial surface for the opposing end, the plane surfaces abutting.

The powerful tendency of a porous structure to expand and elongate a cross-section is utilized in this invention to seal the joint about the movable surface without the assistance of other available reactions. For example, Fig. 12 shows an assembly of converging ring sections acted upon by a pressure P and held in place by the gland 54. The transverse width of the ring cross-sections decrease due to their convergence, when their distance from the source of pressure is considered, the ring $n$ width being much shorter than that of ring $h$. According to my theory of porous columns, the shortening of the cross-sections increases the intensity of the saturation pressure, that is, the internal pressure is raised in a shorter column. There is also the tendency in a longer column to buckle and draw away from its confining surfaces. Therefore in progressing through the rings successively, as $h$, $j$, $k$, $m$ and $n$, the internal pressure is regulated by the number of rings, the degree of convergence of the sections, or the convergence of the section laminations. At ring $n$ the saturated films $x$ and $y$, represented by the small arrows, may be built up by the regulations specified, to a pressure needed to counteract the impressed pressure P after it has been reduced by the corresponding films along the length of the contact. This may give a uniform line of pressure drop.

The structure of the material used in the manufacture of the rings also controls the fineness of the pores, called the porosity, and for practical considerations in controlling internal pressure drop, I now refer to my method of assembling unequal density rings, application Serial Number 571,822, filed October 29, 1931. This method is applied in Fig. 12, the ring $h$ is made very porous, $j$ is less so, and rings $m$ and $n$ are very dense. This arrangement of ring densities is represented by the heaviness of the cross-hatching lines and is a further control of internal pressure drop to realize the ideal pressure distribution. Furthermore, this principle of unequal and graduated densities may be applied to the laminations of Fig. 8, the laminations being made of a density according to their distance from the source of pressure to build up films on the stationary and movable surfaces in any proportion as may be needed.

Referring again to Fig. 9, the general outline of the packing member shows a longer contact at the stationary surface. If a member is made in this shape and of plastic materials, for example, there being no sections, the effect of the constant-friction design is realized in some degree, in lower rate of frictional increase. Using the same plastic materials in conical section forms as indicated by Fig. 9 will give a still lower friction.

The sections of the constant-friction packing do not have to be porous. A set of impervious rubber converging cones in some conditions gives a "flat-compounded" frictional line. Metal foils fabricated into these cones will give a similar result. The angular relation of the converging cones is an important feature which will reduce the friction.

The use of laminations, or laminated rings, as shown by Fig. 8 is another feature in increasing the efficiency of design. For some purposes porous cloths such as asbestos and cotton are to be preferred, while for others, metal foils with and without perforations are best. Laminations are especially desirable for use against high gravity oils, such as butane and propane. They are also useful in packing against steam, air and gases.

The final step in controlling the distribution of the constant-friction structure is shown by Fig. 12, the porosity relation. Thus a member shown by the outline of Fig. 9 may be constructed with a high porosity at the inner end, gradually decreasing according to the distance from the source of the pressure. The sections shown in the same figure may be arranged according to a predetermined plan of porosity change and then the laminations of Fig. 8 may be so arranged to gradually decrease the internal pressure.

It will be noted that by constructing the packing rings in the manner described and arranging them in the stuffing box inclined from the wall of the box away from the source of pressure, I am enabled to direct the forces of compression in such manner that the pressures along the rod are comparatively uniform and constant, and are considerably less than with the usual arrangement of packing. The end thrust upon the packing in the box is taken up by the gland and the force due to expansion under saturation of the packing is directed away from the moving part. In this manner I obtain a packing which has little wearing effect upon the rod and yet seals the same tightly against the escape of the pressure fluid.

Having described my invention, what I claim is:

1. A set of packing devices adapted to fit within a stuffing box and seal about a moving rod, comprising a plurality of rings, the opposed faces of which are not parallel, the outer portions of said rings adjacent said box being thicker than the portions adjacent the said rod.

2. A packing set such as is set out in claim 1 wherein all of said rings are inclined inwardly from the inner wall of said box and away from the source of the pressure fluid to be sealed off.

3. A set of packing such as is set out in claim 1 the opposed surfaces of the rings being inclined from the wall of said box away from the source of pressure fluid, the outer of said rings having a radial surface to engage a gland.

4. A packing member for a stuffing-box confined between a movable and a stationary surface, said member comprising a plurality of contiguous sections, each of said sections having opposite nonparallel convex and concave faces respectively, said faces converging from the wall of the stuffing box toward said movable surface.

5. A packing member for a stuffing box subjected to a fluid medium under pressure, said member having a cone-shaped depression for one face and the opposing face being radial, said member being comprised of a series of contiguous sections, the contacting faces of every section being conical in shape, the outer margins of said sections being of greater thickness than the inner margin and the opposite sides of said sections inclining from the wall of said box away from the source of said fluid pressure.

6. A packing member for a stuffing box subjected to a fluid medium under pressure and adapted to fit about a rod, said member having for one face a depression formed by a concave surface, the opposing face being radial, the length of said member being greater along the wall of said box than along said rod, said member including a series of non-parallel sections, the contacting faces of said sections being conical, the concave surfaces of said sections inclining from the stuffing box wall away from the source of said medium.

HARLEY T. WHEELER.